(12) United States Patent
Mankins (10) Patent No.: US 7,900,194 B1
(45) Date of Patent: Mar. 1, 2011

(54) KERNEL-BASED INTRUSION DETECTION USING BLOOM FILTERS

(75) Inventor: David P. Mankins, Cambridge, MA (US)

(73) Assignees: Verizon Corporate Services Group Inc., Basking Ridge, NJ (US); Raytheon BBN Technologies Corp., Basking Ridge, NJ (US)

( * ) Notice: Subject to any disclaimer, the term of this patent is extended or adjusted under 35 U.S.C. 154(b) by 1018 days.

(21) Appl. No.: 11/088,151

(22) Filed: Mar. 23, 2005

Related U.S. Application Data (60) Provisional application No. 60/556,425, filed on Mar. 25, 2004.

(51) Int. Cl.
  *G06F 9/44* (2006.01)
  *G06F 11/00* (2006.01)
  *G06F 7/04* (2006.01)
(52) U.S. Cl. .................. 717/127; 726/23; 726/25; 726/27
(58) Field of Classification Search .................. None
  See application file for complete search history.

(56) References Cited

U.S. PATENT DOCUMENTS

| | | | |
|---|---|---|---|
| 7,162,741 B2 * | 1/2007 | Eskin et al. | 726/25 |
| 7,222,366 B2 * | 5/2007 | Bruton et al. | 726/23 |
| 2002/0138755 A1 * | 9/2002 | Ko | 713/201 |
| 2004/0243828 A1 * | 12/2004 | Aguilera et al. | 713/200 |
| 2004/0255032 A1 * | 12/2004 | Danieli | 709/229 |
| 2005/0229254 A1 * | 10/2005 | Singh et al. | 726/23 |

OTHER PUBLICATIONS

Michael Mitzenmacher "Bloom Filters: A History and Modern Applications", pp. 1-45 [online] [retrieved on Dec. 30, 2008]. Retrieved from http://www.eecs.harvard.edu/~michaelm/TALKS/NewZealandBF.ppt.*

* cited by examiner

*Primary Examiner* — Michael J Yigdall
*Assistant Examiner* — Evral Bodden (57) ABSTRACT

Kernel-based intrusion detection using Bloom filters is disclosed. In one of many possible embodiments for detecting an intrusion attack, a Bloom filter is provided and used to generate a Bloom filter data object. The Bloom filter data object contains data representative of expected system-call behavior associated with a computer program. The Bloom filter data object is embedded in an operating system ("OS") kernel upon an invocation of the computer program. Actual system-call behavior is compared with the data in the Bloom filter data object.

29 Claims, 3 Drawing Sheets

KERNEL-BASED INTRUSION DETECTION USING BLOOM FILTERS

RELATED APPLICATION

This application claims priority under 35 U.S.C. §119(e) to U.S. Provisional Patent Application Ser. No. 60/556,425, by David P. Mankins, filed on Mar. 25, 2004, and entitled KERNEL-BASED COMPUTER IMMUNOLOGY WITH BLOOM FILTERS, the contents of which are hereby incorporated by reference in their entirety.

FIELD

Kernel-based intrusion detection using Bloom filters is disclosed.

BACKGROUND OF THE INVENTION

Today, many network infrastructures (e.g., the Internet) are vulnerable to attack. Indeed, attackers have access to a wide range of tools capable of degrading network performance or disabling network resources. Even a single well-targeted data packet may be sufficient to cause an operating system of a network device to crash. Moreover, network devices continue to become more vulnerable to attack as standardized protocols are adopted and implemented.

Because vulnerability to attack is a significant concern to network communities, many techniques have been developed to defend networks and computers (collectively "networks") from malicious attacks. For example, "computer immunology" is a term used to describe computer-based intrusion detection techniques inspired by biological immune systems. Such intrusion detection techniques are typically designed to detect computing anomalies to identify intrusions into a network. To elaborate, it is a widely accepted theory that a biological immune system is able to distinguish "self" from "other" through clues made up of proteins. In computer immunology, similar theories are applied to networks to distinguish "anomalous" behavior from "normal" behavior. "Normal" behavior may be defined differently but generally refers to observable and acceptable behavior characteristics expected of networks when not under attack. "Anomalous" behavior then refers to any deviation from the defined normal behavior. The detection of anomalous behavior is used to identify intrusion attacks, which tend to cause computer programs to take unusual execution paths.

Several immunology-inspired intrusion detection techniques involve the tracking of system calls to monitor the behavior of computer programs. System calls refer to mechanisms used by computer programs to request service from the operating system ("OS") of a computer. System calls invoke low-level OS routines that allow the OS to perform restricted actions such as accessing hardware devices (e.g., processors, input and output devices, memory) and other shared machine resources (collectively "shared resources"). Accordingly, the OS (typically the kernel of the OS) is able to allocate and control the shared resources of a computer to fulfill requests received from computer programs.

Conventional system-call-based intrusion detection techniques typically compare monitored system-call sequences with a predefined set of normal system-call sequences to identify occurrences of anomalous sequences. To define the set of normal system-call sequences, sequences of system calls are tracked for a particular computer program as it operates under test conditions (e.g., when the computer or network is not under attack). The tracked system-call sequences are inserted into a database to form a profile of system-call sequences that are considered to be normal operations of the particular program. When the same program operates under real circumstances (e.g., the possibility of attack exists), system-call sequences are monitored and used to identify potential intrusions. In particular, the monitored system-call sequences are compared with the predefined normal system-call sequences stored in the profile database. As long as the monitored system-call sequences have a match in the profile database, operation is considered to be normal. However, if a monitored system-call sequence is not found in the profile database, operation is considered to be anomalous, which may indicate an intrusion attempt.

Unfortunately, several shortcomings are apparent in existing system-call-based intrusion detection techniques. For example, significant delays are inherent in these techniques and may make them impracticable for use with complex computer programs that are processed at high speeds. In particular, it takes time to compare system calls tracked in the OS kernel with data of a profile database stored outside of the OS because communications must be sent back and forth between the OS kernel and the profile database. Because of the sizes of traditional profile databases, it has been impracticable to store them in the OS kernel, which has strict size requirements because, typically, it is continuously operating in main memory.

Moreover, additional delays are introduced by the amount of time required to identify and access the appropriate profile database associated with a particular computer program. Even additional time is required for searching the database, especially when the database is of large size due to the complexity of the particular computer program being monitored. These and other delays tend to render conventional intrusion detection techniques impracticable for many applications, especially applications in which complex programs operate at high processing speeds or when the detection of intrusion attempts is time sensitive.

SUMMARY OF THE INVENTION

Kernel-based intrusion detection using Bloom filters is disclosed. In one of many possible embodiments, a Bloom filter is used to generate a Bloom filter data object. The Bloom filter data object contains data representative of expected system-call behavior associated with a computer program. The Bloom filter data object is embedded in an operating system ("OS") kernel upon an invocation of the computer program. Actual system-call behavior is compared with the data in the Bloom filter data object. The comparisons facilitate real-time detection of actual system-call behavior that deviates from the expected system-call behavior and that may be indicative of intrusion attacks.

In some embodiments, the expected system-call behavior is generated automatically from system calls monitored at the OS kernel during operation of the computer program under training conditions. In some embodiments, training conditions include isolation of the computer program from intrusion attacks. In some embodiments, an alert is issued in response to a detection of anomalous system-call behavior.

The present disclosure will be more fully understood upon reading the following detailed description in conjunction with the accompanying drawings.

BRIEF DESCRIPTION OF THE DRAWINGS

The accompanying drawings illustrate various embodiments and are a part of the specification. The illustrated

DETAILED DESCRIPTION

I. Overview

A system and method for kernel-based intrusion detection using Bloom filters are disclosed. More specifically, the disclosed system and method (collectively the "intrusion detection system") use Bloom filters to detect intrusions (e.g., attacks from external sources) into computers or networks by monitoring the behavior of computer programs and comparing the monitored actual behavior with predefined Bloom filter data to identify any anomalous behavior that may indicate an intrusion attempt. The predefined Bloom filter data is representative of "normal" computer program behavior, which refers to behavior that is expected during operation of the computer programs when not subject to intrusion attempts.

The intrusion detection system may monitor behavior of a computer program by tracking system calls or system-call sequences (collectively "system-call behavior") initiated by the computer program. As mentioned above, system calls refer to mechanisms used by computer programs to request service from the operating system ("OS") of a computer. First, normal (i.e., expected) system-call behavior is defined by monitoring system-call behavior during operation of the computer program under training conditions (e.g., when the computer program is not subject to intrusion attacks). The intrusion detection system then uses a Bloom filter to generate a Bloom filter data object containing data representative of the normal system-call behavior. The generation of the Bloom filter data object will be described in detail further below.

When the computer program is invoked under "real" (i.e., actual) circumstances, meaning the program may be subject to intrusion attempts, the Bloom filter data object is embedded in the OS kernel of the computer and used to identify any anomalous behavior of the computer program. More specifically, the intrusion detection system is able to compare actual system-call behavior with the data in the Bloom filter data object. Anomalous behavior is identified when the actual system-call behavior does not have a match in the Bloom filter data object. The intrusion detection system may respond to a detection of anomalous behavior in a wide variety of ways, including issuing an alert.

By using a Bloom filter to represent predefined normal behavior of a computer program, the intrusion detection system is able to detect anomalous behavior in real time. More specifically, the Bloom filter provides a mechanism for compactly storing data in a structure that is small enough to be practicably embedded in the OS kernel. By embedding the Bloom filter data object in the OS kernel, the intrusion detection system is able to compare actual program behavior monitored in the OS kernel with predefined normal program behavior, without having to access data outside of the OS kernel. This allows comparisons to be performed at the operating system level of a computer in real time. The intrusion detection system is therefore not hindered by delays associated with identifying and accessing databases outside of the operating system.

II. System View

Figure 1:
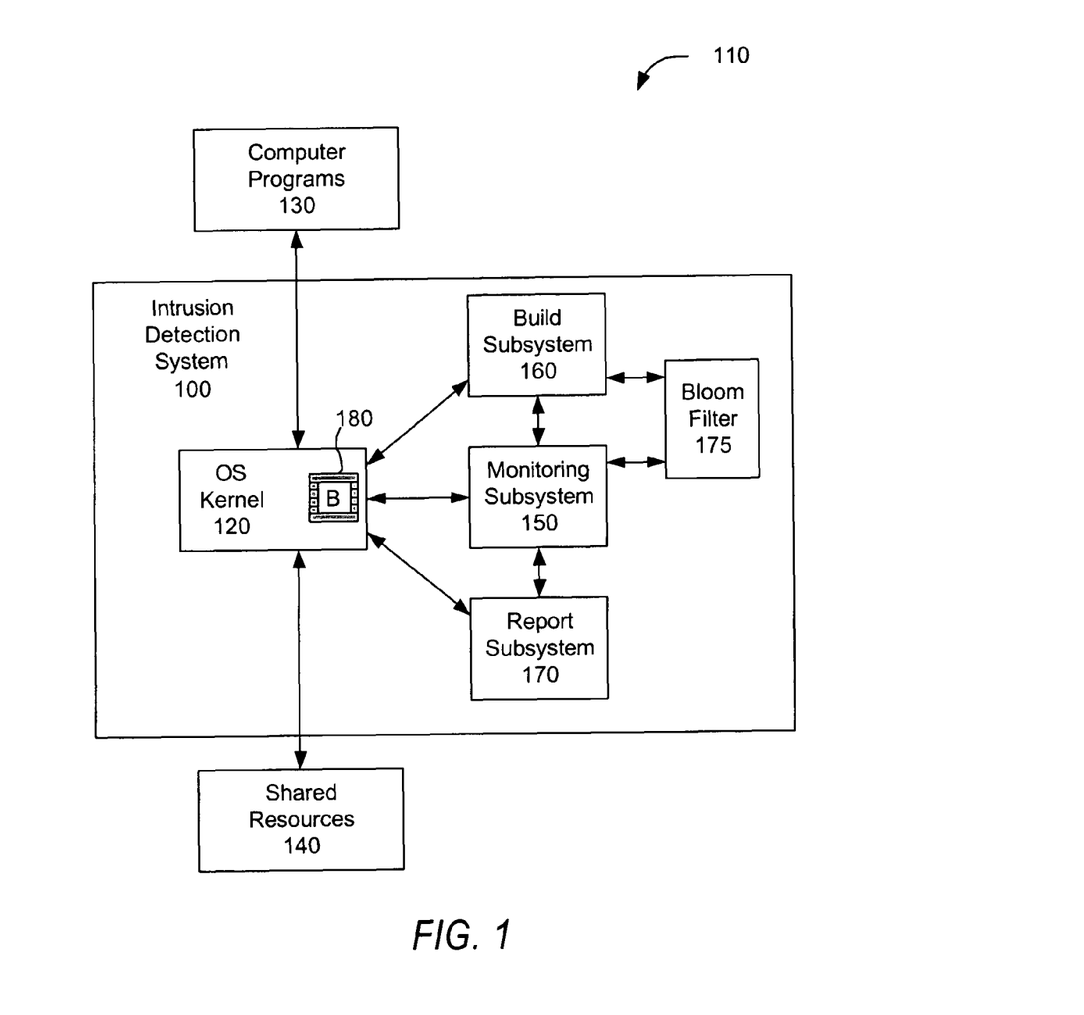
FIG. 1 is a block diagram illustrating an exemplary intrusion detection system implemented in an example of a computer, according to one embodiment.

FIG. 1 is a block diagram illustrating an example of an intrusion detection system 100 implemented in an exemplary computer 110. As shown in FIG. 1, the computer 110 includes an operating system ("OS") kernel 120 configured to interface computer programs 130 with shared resources 140. The intrusion detection system 100 includes a monitoring subsystem 150, a build subsystem 160, and a report subsystem 170 configured to interact with the OS kernel 120. The intrusion detection system 100 further includes a Bloom filter 175 accessible to the build subsystem 160 and the monitoring subsystem 150. Further, a Bloom filter data object 180 may be embedded in the OS kernel 120 as shown in FIG. 1. Each of the components shown in FIG. 1 will now be described in detail.

While an exemplary implementation of the intrusion detection system 100 is shown in FIG. 1, those skilled in the art will recognize that the exemplary components illustrated in the Figure are for purposes of illustration and are not intended to be limiting. Indeed, those skilled in the art will recognize that other alternative hardware environments may be used in other embodiments. For example, the intrusion detection system 100 may be implemented in a distributed fashion over a network of computing devices.

A. Computer

As shown in FIG. 1, the computer 110 may include the intrusion detection system 100, computer programs 130, and shared resources 140. The OS kernel 120 may be part of an operating system (not shown) operating on the computer 110. The computer 110 is meant to be defined broadly as any computing device or combination of computing devices. The computer 110 may include one or more general purpose computers capable of running a wide variety of different software applications or one or more specialized devices limited to particular functions. The computer 110 may include a networking device or combination of networking devices including, but in no way limited to, a router, server, switch, and gateway. The computer 110 may include any type, number, form, or configuration of processors, memory, memory management units, buses, computer-readable mediums, peripheral devices, operating systems, and OS kernels 120. The computer 110 may also include bio-computers or other intelligent devices (e.g., artificially intelligent device). In many embodiments, the computer 110 is in the form of one or more network servers.

B. Shared Resources

The shared resources 140 refer to any resources of the computer 110 that may be shared between different computer programs 130 and/or different users. For example, shared resources 140 may include, but are not limited to, processors, memory, memory management units, hardware components, buses, input and output ports, input and output devices, peripherals, display devices, communication ports, network interfaces, and the like. As known to those skilled in the art, allocation of the shared resources 140 between different computer programs 130 and users may be controlled by the OS kernel 120.

C. Computer Programs

Computer programs 130 refer to any set or sets of instructions capable of being executed by the computer 110. The computer programs 130 typically include predefined sets of instructions (e.g., executable images) that determine specific actions to be performed by the computer 110 when one or more of the computer programs 130 are executed by the computer 110. The computer programs 130 may include, but are not limited to, application programs, system programs, network server programs, and any programs having set-user-ID ("SUID") privileges, which will be understood by those skilled in the art.

D. OS Kernel

As known to those skilled in the art, the operating system ("OS") kernel 120 is typically the core part of an operating system (not shown) of a computer 110. The OS kernel 120 is generally loaded into main memory (not shown) whenever the operating system of the computer 110 is operating. As will be understood by those skilled in the art, the OS kernel 120 is configured to control essential and privileged services generally provided by the operating system of the computer 110, including communicating with shared resources 140 such as hardware components.

In particular, the OS kernel 120 is configured to interface the computer programs 130 with the shared resources 140. As any particular computer program 130 is invoked for execution by the computer 110, the computer program 130 is typically loaded into the main memory of the computer 110. As the computer program 130 is executed, system calls are initiated in accordance with the set of instructions defined by the computer program 130. As known to those skilled in the art, system calls refer to mechanisms used by computer programs 130 to request service from the operating system of the computer 110. The OS kernel 120 receives system calls and responds by invoking low-level operating system ("OS") routines that allow the operating system to perform restricted actions such as accessing the shared resources 140. Accordingly, the OS kernel 120 is able to allocate and control the shared resources 140 of the computer 120 to fulfill requests (e.g., system calls) initiated by computer programs 130. Because the OS kernel 120 responds to system calls, it is convenient to monitor the system calls at the OS kernel 120.

E. Intrusion Detection System

The intrusion detection system 100 may include one or more sets of instructions (e.g., software processes) embodied or otherwise carried on a medium that can be read by the computer 110. The medium carrying the instructions of the intrusion detection system 100 can be part of or otherwise communicatively coupled to the computer 110 and can include any suitable form of computer-readable medium or media. In preferred embodiments, the instructions are embodied within an operating system (not shown) of the computer 110. By being embodied within the operating system, the intrusion detection system 100 reduces delays associated with monitoring system calls in the OS kernel 120 because processing can be performed within the operating system. In some embodiments, the intrusion detection system 100 may be embodied within the OS kernel 120 to reduce delays even further. However, in alternative embodiments, the intrusion detection system 100 may be embodied outside of the operating system and loaded into main memory during execution.

As mentioned above, the intrusion detection system 110 is able to monitor behavior of computer programs 130 by tracking system-call behavior in the OS kernel 120. From the monitored system-call behavior, the intrusion detection system 110 is able to identify potential intrusion attacks that have caused anomalous system-call behavior to occur. Exemplary functionalities of the intrusion detection system 100 will now be described in greater detail with reference to the monitoring subsystem 150, the build subsystem 160, the Bloom filter 175, and the report subsystem 170.

1. Monitoring Subsystem

The monitoring subsystem 150 is configured to monitor behavior of the computer programs 130. Any observable indicators of program behavior may be tracked by the monitoring subsystem 150. In preferred embodiments, the monitoring subsystem 150 is configured to monitor system calls occurring in the OS kernel 120. The system calls can be associated with their initiating computer program(s) 130. A rolling log of system calls may be maintained.

In many embodiments, the monitoring subsystem 150 may use the rolling log of system calls to monitor system-call sequences occurring in the OS kernel 120. The size ("k") of the system-call sequences may be any suitable predetermined number of system calls. The sequence size may be application specific and may be selected to optimize intrusion detection for any specific application of the intrusion detection system 100.

To illustrate the monitoring of system-call sequences, consider an exemplary trace of system calls contained in a rolling log of system calls. If the trace includes the system calls "open, read, mmap, mmap, open," a window of predetermined size k may be slid across the trace to determine each k-size sequence present in the trace. For example, if it is assumed that k=3, the following sequences are contained in the trace: "open, read, mmap," "read, mmap, mmap," and "mmap, mmap, open." Such sequences may be monitored and used to determine whether a potential intrusion has occurred.

More specifically, the monitoring subsystem 150 may monitor system-call sequences and compare the monitored sequences with predefined normal system-call sequences to determine whether an anomalous sequence of system calls has occurred in the OS kernel 120, as mentioned above. For example, during operation of a particular computer program 130, the monitoring subsystem 150 may observe a system-call sequence of "read, mmap, read." The monitoring subsystem 150 may then compare this system-call sequence with the predefined normal system-call sequences. If a match is not found, the observed system-call sequence is determined to be anomalous and may indicate an intrusion attempt. The monitoring subsystem 150 may use system-call sequences to detect intrusions in accordance with any techniques known to those of ordinary skill in the art. Merely by way of example, the monitoring subsystem 150 may be configured to use any of the known techniques described in "Computer Immunology," by S. Forrest, S. Hofineyr, and A. Somayaji, *Communications of the ACM*, Vol. 40, No. 10, pp. 88-96 (1997), the contents of which are hereby incorporated by reference in their entirety. This article is hereinafter referred to as the Forrest article.

As mentioned above, the monitoring subsystem 150 is able to compare monitored system-call behavior with predefined normal system-call behavior. Normal system-call behavior may be defined by the build subsystem 160 and represented in a Bloom filter data object 180, as described below.

2. Build Subsystem

The intrusion detection system 100 is capable of defining what is to be considered normal (i.e., expected) behavior of the computer programs 130. As mentioned above, normal behavior (e.g., expected system-call behavior) refers to behavior that is expected to be initiated by computer programs 130 when not subject to intrusion attacks. To define normal behavior, a particular computer program 130 may be invoked and operated under training conditions in order to determine a set of operations initiated by the computer program 160. The training conditions may include a configuration in which the computer program 130 is isolated from any potential intrusion (e.g., the computer 110 may be offline). As the computer program 130 is operated under training conditions, the monitoring subsystem 150 is able to monitor the behavior of the computer program 130 in any of the ways described above, including monitoring system-call behavior at the OS kernel 120.

The build subsystem 160 is configured to use the program behavior monitored during training conditions to generate a data profile representative of the observed normal behavior caused by a particular computer program 130. This may be performed using any technique known to those skilled in the art. For example, the build subsystem 160 may form a profile database containing unique system-call sequences of a predetermined size ("k") (e.g., unique sequences of six system calls) as described in the Forrest article, the contents of which have been incorporated herein by reference in their entirety. Such a profile of system-call sequences defines a set of normal system-call sequences that may be used as a basis of comparison to identify any deviations from the normal sequences.

The build subsystem 160 is configured to store the generated profiles of normal program behavior (e.g., sets of unique system-call sequences) compactly by using the Bloom filter 175. As known to those skilled in the art, Bloom filters 175 include data structures that are well-suited for compactly storing data for use in membership tests. In particular, the build subsystem 160 may use the Bloom filter 175 to generate a particular Bloom filter data object 180 from a profile of normal program behavior. Accordingly, the generated Bloom filter data object 180 will contain data representative of the normal behavior expected of a particular computer program 130.

The build subsystem 160 may generate Bloom filter data objects 180 using any technique known to those skilled in the art. Merely by way of example, the build subsystem 160 may utilize Bloom filters 175 utilizing a known technique as described in "Single-Packet IP Traceback," by A. Snoeren et al., *IEEE/ACM Transactions on Networking (TON)*, Vol. 10, No. 6, pp. 721-734 (2002), the contents of which are hereby incorporated by reference in their entirety. This article will hereinafter be referred to as the Snoeren article. Using the technique described in the Snoeren article, the build subsystem 160 is able to encode each unique system-call sequence associated with expected operation of a computer program 130 into a particular Bloom filter data object 180, which may be in the form of a bit vector. The Bloom filter 175 and the generation of the Bloom filter data object 180 will be described in detail below.

With the Bloom filter 175, the build subsystem 160 is able to compactly store data representative of predefined normal program behavior. The compactness of the data allows the intrusion detection system 100 to detect intrusions in real time by embedding the compact Bloom filter data object 180 in the OS kernel, where system-call behavior can be tracked and compared with the data in the Bloom filter data object 180 without having to communicate outside of the operating system level of the computer 110.

The build subsystem 160 may be configured to associate a generated Bloom filter data object 180 to its corresponding computer program 130. In particular, the build subsystem 160 may cause the Bloom filter data object 180 to be appended to the executable image of the computer program 130 in a manner that will cause the Bloom filter data object 180 to be automatically embedded in the OS kernel 120 upon invocation of the computer program 130. The computer program 130 may be assigned an identifier, which is designed to indicate to the operating system of the computer 110 that monitoring of the behavior of the computer program 130 should be initiated. Upon the computer program 130 being invoked for operation, the identifier is recognized, and the appended Bloom filter data object 180 is automatically loaded in the OS kernel 120 for use in the monitoring of the behavior of the computer program 130.

The intrusion detection system 100 may be configured to automatically generate Bloom filter data objects 180 for computer programs 130 and then automatically use the Bloom filter data objects 180 to monitor system-call behavior in the OS kernel 120, thereby allowing intrusions to be detected in real time.

3. Bloom Filter

Examples of Bloom filters 175, Bloom filter data objects 180, and associated trade-offs between speed and accuracy of the Bloom filters 175 will now be described in detail. The Bloom filter 175 may be in the form of any known Bloom filter. As known to those skilled in the art, the Bloom filter 175 generally consists of two components: a set of hash functions and a bit vector (e.g., the Bloom filter data object 180) of a given length. The length of the bit vector and the number of hash functions ("h") may be pre-selected depending on speed and memory constraints, as well as the tolerable error rate, of an application.

Any suitable number h of independent and uniform hash functions may be employed to encode predetermined unique system-call sequences into the bit vector. The build subsystem 160 may employ any such suitable known hash functions. Using the hash functions, the build subsystem 160 computes a predetermined number of distinct values for each system-call sequence, and uses these values to index the bit vector. The indexed bits of the bit vector are set to a value of one to represent the encoded system-call sequence. The hash functions are also used to index the bit vector to search for a match to a particular piece of input data, such as a monitored system-call sequence. Preferably, high-quality hash functions are used in the Bloom filter 175 to help guarantee that output is equally distributed over all possible values in the bit vector, which helps to minimize the occurrence of false positives. False positives will be described in more detail below.

In general, while a large bit vector generally requires more memory than a small bit vector, a large bit vector tends to produce lower error rates. Accordingly, it should be understood that the Bloom filter data object 180 is not limited to any particular type or size of data structure and may be configured based on application-specific requirements or preferences. The build subsystem 160 may be configured to generate a Bloom filter data object 180 of any suitable size, including small sizes such as approximately two kilobytes ("2 KB") or three kilobytes ("3 KB"). The Bloom filter data object 180 may be in the form of a bit vector or bitmap data object.

To illustrate the trade-off that exists between the pre-selected size of the Bloom filter data object 180 and the resultant error rate, it is helpful to understand that the compactness of Bloom filters 175 comes from throwing data away to represent the data in a compressed format. The compression of the data creates the possibility that false positives will occur when the Bloom filter data object 180 is searched for a match to a specific piece of input data. False positives refer to occurrences in which a Bloom filter 175 reports the existence of a match when in fact no such match is actually contained in the Bloom filter data object 180. As known to those skilled in the art, one feature of Bloom filters 175 is the ability to be configured to have a specific probability ("P") of a false positive occurring.

The probability P of a false positive is generally based on the size of the bit vector, the number and quality of hash functions, and the amount of input provided to the Bloom filter 175. For example, if it is assumed that one-thousand-twenty-four (1,024) sextuples of unique system-call sequences (i.e., sequences of six system calls) will be hashed to a 2 KB bit vector, the false positive probability P can be computed as a function of the number of hash functions h. A 2 KB bit vector includes sixteen-thousand bits ("16 Kb"), meaning that about $$\frac{h}{16}$$

of the bits of the bit vector has a value of one ("1"). The bits having values of one represent the one-thousand-twenty-four (1,024) sextuples. The probability P of a false positive may then be computed according to the following equation:

$$P = \left(\frac{h}{16}\right)^h.$$

The number of hash functions h may be varied to produce different false positive probabilities P. For example, four hash functions produces a probability, $$P \text{ of } \left(\frac{1}{4}\right)^4, \text{ or } \frac{1}{256},$$

five hash functions produces a probability $$P \text{ of } \frac{1}{335},$$

six hash functions produces a probability $$P \text{ of } \frac{1}{360},$$

and seven hash functions produces a probability $$P \text{ of } \frac{1}{326}.$$

The probability P of false positives may be reduced by increasing the size of the bit vector. For example, if it is assumed that one-thousand-twenty-four (1,024) sextuples of unique system-call sequences will be hashed to a 3 KB bit vector, the probability P of false positives may be computed according to the following equation:

$$P = \left(\frac{h}{24}\right)^h.$$

Again, the number of hash functions h may be varied to produce different false positive probabilities P. For example, three hash functions produces a probability $$P \text{ of } \frac{1}{512},$$

four hash functions produces a probability $$P \text{ of } \frac{1}{1296},$$

five hash functions produces a probability $$P \text{ of } \frac{1}{2548},$$

six hash functions produces a probability $$P \text{ of } \frac{1}{4096},$$

and ten hash functions produces a probability $$P \text{ of } \frac{1}{6819}.$$

Thus, for some applications, it may be desirable to use a 3 KB bit vector instead of a 2 KB bit vector in order to decrease the chances of experiencing false positives.

While the use of Bloom filters 175 may introduce a possibility of false positives, this may be outweighed in many applications by the increases in processing speed that result from being able to detect intrusions at the operating system level of the computer 110. The amount of available main memory on a computer is crucial because it determines how many computer programs 130 can be executed at one time and how much data can be readily available to a particular program 130. However, in many computers, the amount of memory required by a particular Bloom filter data object 180 (e.g., 3 KB) will be a small memory outlay that may easily fit in the process structure of the OS kernel 120, thereby allowing real-time detection of intrusion attacks.

In some network embodiments of the intrusion detection system 100, the size of the Bloom filter data object 180 may be reduced even further when multiple network devices are configured to work together to identify intrusion attacks. In particular, when several network devices generate separate Bloom filter data objects 180, are monitored together, and are subject only to attacks that affect each of the network devices within a small amount of time, it is likely that at least one of the network devices would detect a false positive that is produced by another device. Thus, the sizes of the Bloom filter data objects 180 may be reduced because the different network devices can work together to identify false positives.

4. Report Subsystem

The report subsystem 170 may be configured to respond to a detection of anomalous program behavior. For example, the monitoring subsystem 150 may notify the report subsystem 170 of a detection of anomalous program behavior. The report subsystem 170 may respond by issuing an alert indicating that anomalous behavior has been detected. The alert may be issued to a user or operating system of the computer 110. The intrusion detection system 100 may issue an alert and allow execution of detected anomalous behavior to proceed.

In some embodiments, the report subsystem 170 may be configured to automatically invoke predetermined actions designed to protect the computer 110 or to analyze the nature and/or source of the detected intrusion. For example, the report subsystem 170 may initiate a process for determining a source of an intrusive data packet in accordance with the techniques described in the Snoeren article, the contents of which have been incorporated by reference in their entirety.

III. Process Flow Views

Figure 2:
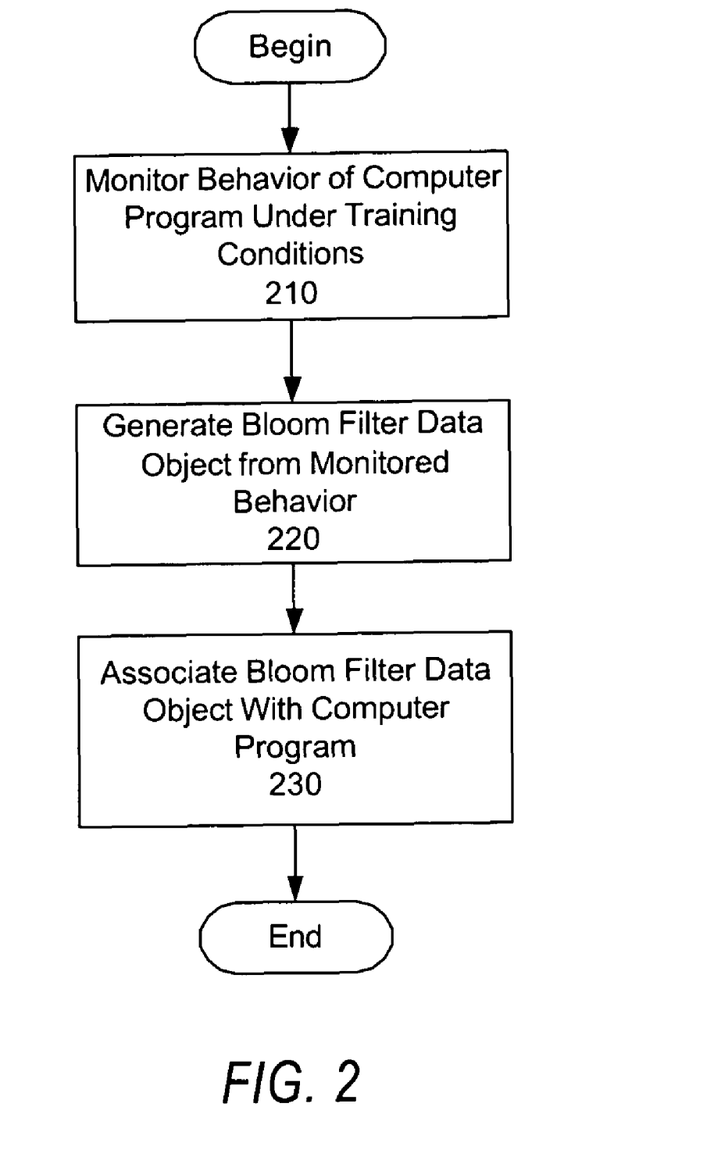
FIG. 2 is a flowchart illustrating an example of a process for defining normal system-call behavior under training conditions, using the intrusion detection system of FIG. 1.

FIG. 2 is a flowchart illustrating an example of a process for defining normal system-call behavior under training conditions. While Figure illustrates exemplary steps according to one embodiment, other embodiments may omit, add to, and/or modify any of the steps shown in FIG. 2.

The process of FIG. 2 begins by monitoring behavior of a computer program 130 under training conditions at step 210. Step 210 may be performed in any of the ways discussed above, including monitoring system-call behavior at the OS kernel 120 when the computer program 130 is not subject to intrusion attacks.

At step 220, a profile Bloom filter data object 180 is built from the monitored behavior. Step 220 may be performed in any of the ways described above, including using the Bloom filter 175 to generate the Bloom filter data object 180, which will contain data representative of predefined normal behavior. In many embodiments, the normal behavior is defined in the form of k-size sequences of system calls.

At step 230, the generated Bloom filter data object 180 is associated with the computer program 130. As discussed above, this may be accomplished by appending the Bloom filter data object 180 to the executable image of the computer program 130. In some embodiments, steps 210 through 230 may be performed automatically to generate the Bloom filter data object 180 in an automated fashion, without requiring user intervention.

Figure 3:
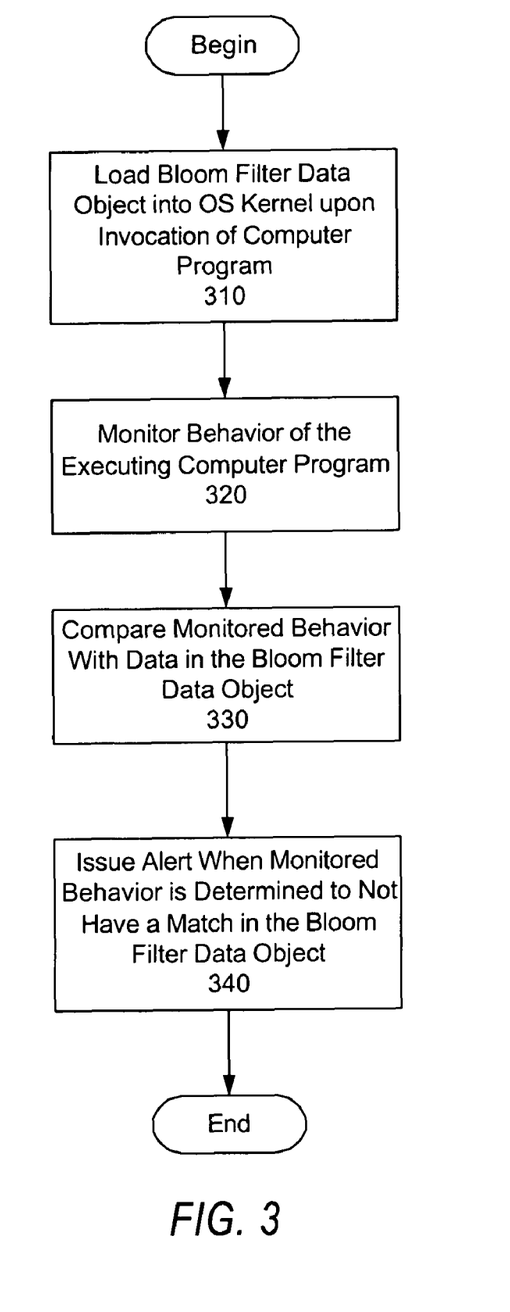
FIG. 3 is a flowchart illustrating an example of a process for detecting intrusion attempts by monitoring system-call behavior, using the intrusion detection system of FIG. 1.

With the Bloom filter data object 180 being appended to the executable image of the computer program 130, the intrusion detection system 100 is prepared to detect intrusion attempts by monitoring the behavior of the computer program 130 when it is executed. FIG. 3 is a flowchart illustrating an example of a process for detecting intrusion attempts by monitoring system-call behavior. While FIG. 3 illustrates exemplary steps according to one embodiment, other embodiments may omit, add to, and/or modify any of the steps shown in FIG. 3.

The process of FIG. 3 begins by loading the Bloom filter data object 180 into the OS kernel 120 upon invocation of the computer program 130 at step 310. Step 310 may be performed in any of the ways described above, including recognizing an identifier associated with the computer program 130 and loading the Bloom filter data object 180 as part of the executable image of the computer program 130.

At step 320, behavior of the computer program is monitored as it is executed by the computer 110. Step 320 may be performed in any of the ways discussed above. For example, the monitoring subsystem 150 may monitor system-call behavior at the OS kernel 120.

At step 330, the monitored behavior is compared with data in the Bloom filter data object 180. Step 330 may be performed by the monitoring subsystem 150, which may use the Bloom filter 175 to search the Bloom filter data object 180 to determine whether a match exists for any particular set of monitored behavior (e.g., a system-call sequence).

At step 340, an alert is issued in response to a determination that the Bloom filter data object 180 does not contain a match for the monitor behavior. As mentioned above, the alert may be issued to the operating system or user of the computer 110. The alert is intended to notify a user or the computer 110 of the detection of anomalous behavior being initiated by the computer program 110. Any appropriate predefined action may be performed in response to the alert.

In conclusion, the use of one or more Bloom filters 175 to represent predefined normal computer program behavior enables the intrusion detection system 100 to detect intrusion attempts in real-time. Bloom filter data is stored in a format small enough to be practicably embedded in the OS kernel 120, where computer program behavior is monitored. This allows the intrusion detection system 100 to perform monitoring and detection functions at the operating system level. Accordingly, intrusion detections can be performed quickly, without having to access data outside of the operating system.

The intrusion detection system 100 may be used to monitor a wide variety of different types of computer programs 130 in different applications. For example, the intrusion detection system 100 may be configured to monitor network server programs. In other embodiments, the intrusion detection system 100 may be configured to detect attempts to "get root" on a computer 110 that allows users to log in. This can be done by monitoring computer programs 130 having a set-user-ID ("SUID") and being owned by the root. Because checks for anomalous behavior are performed at the operating system level, the intrusion detection system 100 is flexible and may be used to monitor many kinds of different computer programs 130 from long-lived network server programs to programs providing interactive command features.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A method comprising:
   monitoring system calls of a computer program, said monitoring step being performed in an operating system ("OS") kernel of the computer;
   using said monitored system calls to define expected system-call behavior of the computer program;
   using a Bloom filter that includes a set of hash functions to generate a Bloom filter data object, said Bloom filter data object containing data representative of expected system-call behavior associated with the computer program;
   appending said Bloom filter data object to an executable image of the computer program;
   embedding said Bloom filter data object in said OS kernel upon an invocation of the computer program; and
   comparing actual system-call behavior with said data in said Bloom filter data object.

2. The method of claim 1, wherein said comparing step is performed in said OS kernel in real time.

3. The method of claim 1, wherein said Bloom filter data object is generated in the form of a bitmap image.

4. The method of claim 1, wherein said data of said Bloom filter data object is representative of predetermined sequences of system calls.

5. The method of claim 1, further comprising issuing an alert in response to a determination that said actual system-call behavior deviates from said data of said Bloom filter data object.

6. The method of claim 1, wherein said expected system-call behavior is determined according to the following steps:
monitoring system calls initiated by the computer program under training conditions; and
defining said expected system-call behavior to include unique system-call sequences found in said monitored system calls.

7. The method of claim 6, wherein said expected system-call behavior is defined automatically, without user intervention.

8. The method of claim 6, wherein said training conditions include the computer program being isolated from intrusion attacks.

9. A method comprising:
monitoring system calls of a computer program operating under training conditions, said monitoring step being performed in an operating system ("OS") kernel of the computer;
using said monitored system calls to define expected system-call behavior of the computer program;
applying a Bloom filter that includes a set of hash functions to said expected system-call behavior to generate a Bloom filter data object, said Bloom filter data object containing data representative of said expected system-call behavior;
appending said Bloom filter data object to an executable image of the computer program;
embedding said Bloom filter data object in said OS kernel upon an invocation of the computer program; and
comparing actual system-call behavior with said data in said Bloom filter data object.

10. The method of claim 9, wherein said comparing step is performed in said OS kernel in real time.

11. The method of claim 9, further comprising issuing an alert in response to a determination that said actual system-call behavior deviates from said data of said Bloom filter data object.

12. The method of claim 9, wherein said expected system-call behavior is defined automatically, without user intervention.

13. The method of claim 9, wherein said training conditions include the computer program being isolated from intrusion attacks.

14. An intrusion detection system tangibly embodied in at least one computing device as one or more sets of computer-executable instructions stored thereon, the instructions comprising instructions used by an operating system ("OS") kernel for:
processing system calls initiated by a computer program;
monitoring system calls of the computer program;
using said monitored system calls to define expected system-call behavior of the computer program;
a Bloom filter that includes a set of hash functions for generating a Bloom filter data object containing data representative of expected system-call behavior associated with the computer program, said Bloom filter data object being appended to an executable image of the computer program and embedded in said OS kernel during operation of the computer program; and
a monitoring subsystem configured to use said Bloom filter to compare actual system-call behavior with said data in said Bloom filter data object.

15. The intrusion detection system of claim 14, wherein said monitoring subsystem is configured to compare said actual system-call behavior with said data in said OS kernel in real time.

16. The intrusion detection system of claim 14, further comprising instructions for a build subsystem configured to automatically generate said expected system-call behavior from system-call sequences monitored by said monitoring subsystem in said OS kernel during operation of the computer program under training conditions.

17. The intrusion detection system of claim 16, wherein said training conditions include the computer program being isolated from intrusion attacks.

18. The intrusion detection system of claim 16, wherein said build subsystem is configured to use said Bloom filter to generate said Bloom filter data object from said expected system-call behavior.

19. The intrusion detection system of claim 14, wherein said data in said Bloom filter data object is representative of system-call sequences of predetermined length.

20. The intrusion detection system of claim 16, wherein said build subsystem is configured to append said Bloom filter data object to an executable of the computer program, said Bloom filter data object being configured to be automatically embedded in said OS kernel upon invocation of the computer program.

21. The intrusion detection system of claim 14, wherein said Bloom filter data object is in the form of a bitmap image.

22. The intrusion detection system of claim 14, further comprising instructions for a reporting subsystem configured to issue an alert in response to a determination that said actual system-call behavior deviates from said data of said Bloom filter data object.

23. A processor-readable medium having instructions thereon for monitoring behavior of a computer program, said instructions being configured to instruct a processor to perform the steps of:
monitoring system calls of a computer program, said monitoring step being performed in an operating system ("OS") kernel of the computer;
using said monitored system calls to define expected system-call behavior of the computer program;
using a Bloom filter that includes a set of hash functions to generate a Bloom filter data object, said Bloom filter data object containing data representative of expected system-call behavior associated with the computer program;
appending said Bloom filter data object to an executable image of the computer program;
embedding said Bloom filter data object in said OS kernel upon an invocation of the computer program; and
comparing actual system-call behavior with said data in said Bloom filter data object.

24. The processor-readable medium of claim 23, wherein said instructions are further configured to instruct the processor to perform a step of issuing an alert in response to a determination that said actual system-call behavior deviates from said data of said Bloom filter data object.

25. The processor-readable medium of claim 23, wherein said instructions are further configured to instruct the processor to perform the steps of:

monitoring system calls initiated by the computer program under training conditions, said training conditions including the computer program being isolated from intrusion attacks; and defining said expected system-call behavior to include unique system-call sequences found in said monitored system calls.

26. The method of claim 1, further comprising comparing actual system-call behavior with said data in said Bloom filter data object by:

identifying a sequence of system calls generated by the computer program, and comparing the identified sequence of system calls with said data in said Bloom filter data object to determine if the identified sequence of system calls is a normal sequence of system calls for the computer program.

27. The method of claim 9, further comprising comparing actual system-call behavior with said data in said Bloom filter data object by:

identifying a sequence of system calls generated by the computer program, and comparing the identified sequence of system calls with said data in said Bloom filter data object to determine if the identified sequence of system calls is a normal sequence of system calls for the computer program.

28. The intrusion detection system of claim 14, wherein the monitoring subsystem is further configured to use said Bloom filter to compare actual system-call behavior with said data in said Bloom filter data object by:

identifying a sequence of system calls generated by the computer program, and comparing the identified sequence of system calls with said data in said Bloom filter data object to determine if the identified sequence of system calls is a normal sequence of system calls for the computer program.

29. The processor-readable medium of claim 23, wherein said instructions are further configured to instruct the processor to perform the step of comparing actual system-call behavior with said data in said Bloom filter data object by:

identifying a sequence of system calls generated by the computer program, and comparing the identified sequence of system calls with said data in said Bloom filter data object to determine if the identified sequence of system calls is a normal sequence of system calls for the computer program.

\* \* \* \* \*